United States Patent [19]

Tse et al.

[11] Patent Number: 4,683,170
[45] Date of Patent: Jul. 28, 1987

[54] NYLON COPOLYMER AND NYLON BLENDS AND FILMS MADE THEREFROM

[75] Inventors: Samuel W. Tse; Deane E. Galloway, both of Appleton, Wis.

[73] Assignee: American Can Company, Greenwich, Conn.

[21] Appl. No.: 820,350

[22] Filed: Jan. 21, 1986

Related U.S. Application Data

[62] Division of Ser. No. 626,415, Jun. 29, 1984.

[51] Int. Cl.$^4$ .............................................. B32B 27/00
[52] U.S. Cl. ..................... 428/349; 428/35; 428/354; 428/474.4; 428/475.8; 428/476.3; 428/516
[58] Field of Search ................. 428/35, 349, 354, 516, 428/474.4, 475.8, 476.3; 525/432

[56] References Cited

U.S. PATENT DOCUMENTS

| | | | |
|---|---|---|---|
| 3,854,653 | 12/1974 | Engelsberger | 428/35 |
| 3,932,340 | 1/1976 | Kamosak et al. | 260/33.8 |
| 3,995,084 | 11/1976 | Berger et al. | 428/475.5 |
| 4,035,436 | 7/1977 | Matsubara et al. | 428/475.5 |
| 4,095,012 | 6/1978 | Schirmer | 428/910 |
| 4,239,826 | 12/1980 | Knott et al. | 428/475.8 |
| 4,361,628 | 11/1982 | Kruegar et al. | 428/516 |
| 4,461,808 | 7/1984 | Mollison | 428/475.5 |
| 4,488,924 | 12/1984 | Kreig | 428/475.8 |
| 4,588,648 | 5/1986 | Kruegar et al. | 428/516 |

FOREIGN PATENT DOCUMENTS 212252 12/1982 Japan .

*Primary Examiner*—Edith Buffalow
*Attorney, Agent, or Firm*—Stuart S. Bowie; Thomas D. Wilhelm; Paul R. Audet

[57] ABSTRACT

A novel composition of matter having surprising physical properties when fabricated into multiple layer films is disclosed. The composition is generally a blend of nylon 6 with a nylon copolymer comprised of nylon 6 and a second nylon polymer. The second nylon polymer is 2.5 to 10 mole percent of the overall composition. The remaining 97.5% to 90% of the composition is the nylon 6 and the nylon 6 component of the copolymer. The nylon composition may be comprised entirely of a nylon copolymer having 90% to 97.5% nylon 6 and 10% to 2.5% of a second nylon polymer. The multiple layer films fabricated with the nylon compositions show unexpected range of thermoforming and heat sealing capabilities and good heat resistance, similar to that of nylon 6.

41 Claims, 5 Drawing Figures

NYLON COPOLYMER AND NYLON BLENDS AND FILMS MADE THEREFROM

This is a division of application Ser. No. 626,415, filed June 29, 1984, herein incorporated by reference.

BACKGROUND OF THE INVENTION

This invention deals with polymers and polymer films as they pertain to packaging products in flexible packaging films where the package is of the type having an inner heat sealable layer and an outer abuse resistant layer of nylon. A variety of these films is available in the commercial market. Exemplary of such films are the structures

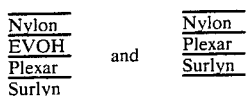

The four layer structure has an inner heat sealable layer of Surlyn, an outer abuse resistant and heat resistant layer of nylon, and an internal gas barrier layer of ethylene vinyl alcohol copolymer (EVOH). The Plexar layer serves as an adhesive between the EVOH and Surlyn layers.

The three layer structure merely omits the EVOH gas barrier layer for uses that do not require high levels of gaseous barrier to protect the product.

Films of this nature are generally formed by multiple layer coextrusion wherein it is desirable to select polymer compositions for the individual layers such that their rheological properties are conducive to intimate and simultaneous parallel melt flows in the coextrusion process.

Films coventionally available have generally used nylon 6 for the nylon layer of the film. Nylon 6, however, presents processing problems in the formulation of the film because the high amount of heat required for processing nylon 6 into film contributes to degradation of other polymers in the film, such as EVOH. Thus special provisions are desired to provide for the coexistent extrusion conditions necessary to coextrude the film; and indeed certain process parameters are precluded by these special provisions.

This problem is addressed in Japanese No. 58 74,313, May 4, 1983, to Sumitomo Bakelite. A coextruded multiple layer film is disclosed therein of the nature

where the nylon is specified as a copolymer which is 80% to 90% nylon 6 and 10% to 20% nylon 66. The Bakelite patent specifies that the melting point of the nylon polymer is close to that of the EVOH polymer. Since the melting point of the nylon polymer is close to the melting point of the EVOH polymer, the major problems of forming the film are thus resolved.

Films of the Bakelite type, however, are limited in their capacity for further heat processing. In heat sealing processes, and in thermoforming processes, the thermal operating ranges which yield acceptable results in the finished package are so narrow as to not be easily sustained over extended periods with commercially available controllers. For example, in the heat sealing process, while the nylon copolymer has a lower softening and extrusion processing temperature, as compared to nylon 6, which is conducive to coextrusion with EVOH, that same lower processing temperature creates problems in heat sealing the package closed. Heat flux that normally would be used with structures having nylon 6 as the outer layer is too high for the nylon copolymer, and the film may be burned through. Another problem associated with the quantity of heat flux required for the heat sealing is that the nylon copolymer may soften and adhere to the sealing bar, and cause jam-up of the packaging machinery. This problem may, at times, be corrected by reducing the amount of heat applied to the nylon layer by the sealing bars. In those cases where the problem may be corrected by reducing the heat applied, the film must spend more time in contact with the sealing bar, thus creating an economic penalty as by slower line speed.

Thus there exists a need for a polymer composition that would have the combination of properties of low temperature extrusion processability and high heat resistance for heat sealing operations.

It is an object of this invention to provide novel nylon compositions which are susceptible of low temperature extrusion and are more readily compatible with coextrusion with EVOH while, at the same time being capable of withstanding the higher heat sealing temperatures normally associated with nylon 6.

It is a further object to provide single-layer films of nylon which have high heat stability like nylon 6 but have a lower temperature extrusion processability than nylon 6, while having a high capacity for accepting heat useful for fabrication processes.

It is a more specific object to provide a multiple layer film having nylon on one surface, and a heat seal layer on the other surface wherein the nylon has the high heat resistant characteristics of nylon 6 in combination with lower extrusion processing temperatures than nylon 6.

SUMMARY OF THE INVENTION

The inventors have found that these and other objectives are attained in a composition of matter which is a blend of 40% to 75% nylon 6, and 60% to 25% of a nylon copolymer wherein the copolymer is 80 to 90 mole percent moieties of a first polymer of nylon 6 and 20 to 10 mole percent moieties of a second polymer of nylon. The overall composition of the blend is 2.5 to 10 mole percent of the second nylon polymer. Preferrably, the overall blend composition is 5% to 7.5% moieties of the second nylon polymer.

The advantages of the invention are most readily discerned in a plastic film having the above blend composition.

A preferred form of the invention is a multiple layer film having a heat sealable layer on one surface and the nylon layer on the other surface, and wherein the composition of the nylon layer is a blend of 40% to 75% by weight nylon 6 and 60% to 25% by weight of a nylon copolymer wherein the copolymer is 80 to 90 mole percent moieties of a first polymer of nylon 6 and 20 to 10 mole percent moieties of a second polymer of nylon; with the overall composition of the blend comprising 2.5 to 10 mole percent moieties of the second polymer of nylon.

A more preferred form of the invention is a multiple layer heat sealable film having two surfaces and comprising a first heat sealable layer on one surface of the film, a second nylon layer on the other surface of the film and a third layer of ethylene vinyl alcohol copolymer between the first and second layers. A fourth adhesive layer is between the first and third layers. The second layer is a blend of nylon polymers and copolymers. The blend is 40% to 75% by weight nylon 6 and 60% to 25% by weight of a nylon copolymer wherein the copolymer is 80 to 90 mole percent moieties of a first polymer of nylon 6 and 20 to 10 mole percent moieties of a second polymer of nylon, the overall composition of the blend being 2.5 to 10 mole percent moieties of the second polymer of nylon. Most desirably the overall composition of the nylon copolymer in the second layer is 5 to 7.5 mole percent.

In another preferred embodiment of the invention, which is a modification from the four-layer film, an additional, fifth, layer is interposed between the second and third layers.

In yet another preferred embodiment of the invention, which is also drawn from the four layer film, an additional, sixth layer of a polymer or copolymer of polypropylene or polyethylene is disposed between the first and fourth layers. This sixth layer may be present with or without the presence of the earlier-iterated fifth layer. Where the fifth layer is not present, and the sixth layer is present, there may be as few as five layers, making a five layer film, irrespective of the sixth layer nomenclature. Likewise, the fifth layer may be present without the sixth layer.

In one preferred structure, the second polymer of nylon is nylon 66 or nylon 12, and is present as 5.0 to 5.5 mole percent of the overall blend composition of the second layer.

In another preferred form, the second polymer of nylon comprises nylon 66 or nylon 12, and is present as 7.25 to 7.75 mole percent of the overall blend composition of the second layer.

The invention is most easily discerned in a closed and sealed package which consists of a containing packaging film and a moist product therein. The package is suitable for use in a moist environment, and is susceptible to being closed by heat sealing. The packaging film has a first heat sealable surface layer on the surface of the film disposed toward the interior of the package, a second nylon surface layer on the surface of the film disposed toward the exterior of the package, and a third layer of ethylene vinyl alcohol copolymer between the second layer and the first layer. A fourth adhesive layer is between the first and third layers. A fifth layer of polypropylene or polyethylene may be between the second and third layers, such that the fourth and fifth layers are interposed between the ethylene vinyl alcohol layer and the respective one of the surface layers.

The second nylon layer is a blend of 40% to 75% by weight nylon 6, and 60% to 25% by weight of a nylon copolymer wherein the copolymer is 80 to 90 mole percent moieties of nylon 6 and 20 to 10 mole percent moieties of a second nylon polymer. The overall composition of the blend is 2.5 to 10 mole percent moieties of the second nylon polymer. It has been found that most desirably the overall composition of the second nylon polymer in the second layer is 5 to 7.5 mole percent nylon 66 or nylon 12.

The composition of the second layer may alternatively be comprised of an unblended nylon copolymer wherein the copolymer is 90 to 97.5 mole percent nylon 6 and 10 to 2.5 mole percent of a second polymer of nylon. Nylon 66 and nylon 12 are preferred for the second polymer of nylon, though other nylons are operable.

DETAILED DESCRIPTION OF THE PREFERRED EMBODIMENTS OF THE INVENTION

The primary considerations of the invention reside in the blending of nylon polymers to achieve an improved and unexpected combination of properties in a heat sealable packaging film.

In its simplest form, the invention is a composition of matter which is an intimate and compatible blend of (i) nylon 6 and (ii) a copolymer of nylon 6 with a second nylon-type polymer, preferrably nylon 66 or nylon 12, although other nylon polymers are acceptable. The blend is prepared such that the second nylon-type polymer is 2.5 to 10 mole percent of the overall composition of the blend.

The nylon blend compositions of this invention are conveniently made into useful products by any of the conventional fabrication processes. Seen as particularly advantageous are forms wherein the nylon is shaped into a packaging film such as by extrusion or coextrusion. While a single layer film of the nylon blend may be conveniently formed as by extrusion, it is anticipated, and applicants' experience has shown, that a preferred film is a multiple-layer film formed as by coextrusion of a layer of the nylon blend with other layers which serve other and specific purposes. Functionally acceptable multiple layer films within the teaching of this invention may be made by other methods. For example, the nylon blend composition may be formed into a single layer film and subsequently laminated, as by adhesive or extrusion lamination, to other separately formed layers, or may be extrusion coated or coextrusion coated to form a multiple layer film. Because of the beneficial economics of coextrusion, the description herein is directed to that process. While certain process benefits are seen in the coextrusion of nylon blend films of the invention, other advantages of the films of the invention are related to the functional performances of the film as part of a package. Thus, while the films of the invention are advantageously formed by coextrusion, the emphasis herein on that illustrative process should not be construed as limiting to the scope of the invention. Likewise, the nylon blend compositions herein may be fabricated, for example by molding, or by other fabrication processes without departing from the scope of the invention contemplated.

Figure 1:
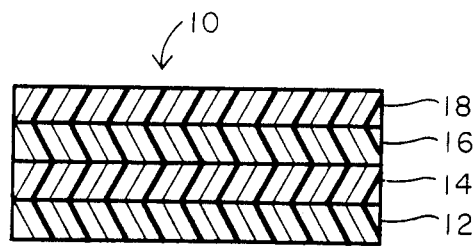
FIGS. 1, 1A, 2, and 2A depict multiple layered structures within the scope of this invention.

Typical of films of this invention are those shown in FIGS. 1, 1A, 2 and 2A. The overall film of FIG. 1 is designated 10. Layer 12 is a heat sealable layer. Layer 14 is an adhesive layer. Layer 16 is ethylene vinyl alcohol copolymer (EVOH). Layer 18 is the nylon blend layer. The film of FIG. 1A, designating the overall film as 10A, is derived from the structure of FIG. 1, and has layers of similar compositions numbered the same as those of FIG. 1, and with the "A" suffix. Thus, for example, layers 18 and 16 in FIG. 1 have the same general families of compositions as layers 18A and 16A in FIG. 1A, respectively. The difference between the structures of FIGS. 1 and 1A lies primarily with layer 19A, which is an additional layer as compared to the FIG. 1 structure. The primary purpose of layer 19A is to provide thickness to the structure at an economical cost. Typical materials for layer 19A are polyethylene or ethylene vinyl acetate copolymer (EVA). As further illustration of the scope of the invention, layer 19A could serve any of a number of purposes; and may indeed comprise more than one layer entity.

Figure 1A:
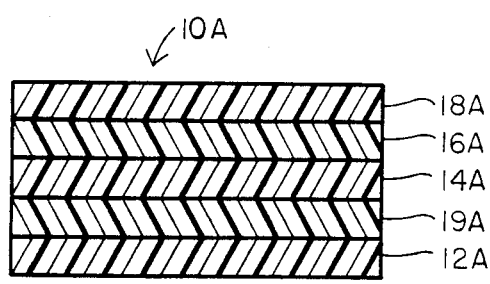
Figure 2:
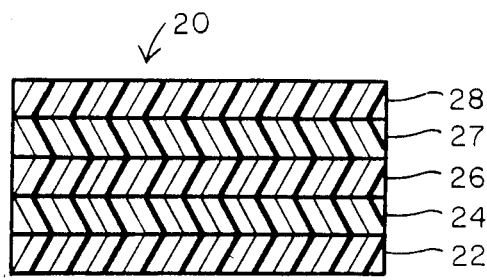
Figure 2A:
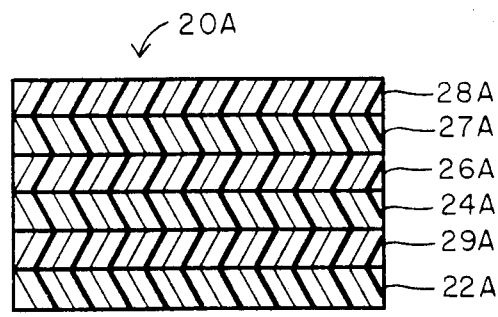

With reference now to FIGS. 2 and 2A, it is seen that the overall films are designated 20 and 20A respectively. The individual layers in FIGS. 2 and 2A are identified by 20's series numbers, whereas the layers in FIGS. 1 and 1A are identified by 10's series numbers. Layers having comparable compositions and functions are given the same final digit in the numbering. Thus layers 28, 28A, 18, and 18A all have similar compositions. Likewise, layers 24, 24A, 14, and 14A all have similar compositions.

In FIG. 2, an additional layer is added at 27, between layers 26 and 28. FIG. 2A is derived from FIG. 2. The difference between FIGS. 2 and 2A resides in the additional layer 29A which is used for providing thickness to the film as at layer 19A in FIG. 1A.

Layers 12, 12A, 22, and 22A are first surface layers on the exterior of their respective films and are comprised of heat sealable polymer. Selection of materials which are acceptable for the heat seal layer is defined by the functional capability of the heat seal layer to perform its sealant function while functioning compatibly with the other layers in the package. Performing the sealant function includes forming the heat seal and retaining the seal integrity and the package integrity for the duration of the expected life of the package. Such known sealant layers include the various polyethylenes, polypropylenes, and propylene and ethylene copolymers. Preferred sealant layer compositions are surlyn or EVA.

The second surface layer on the film, namely on the surface opposite the sealant layer, is the nylon blend composition. The nylon blend composition is 90 to 97.5 mole percent nylon 6 and 10 to 2.5 mole percent of a second nylon polymer, and preferrably nylon 66 or nylon 12. The composition of the nylon blend layer is conveniently obtained by blending a nylon 6 polymer with a copolymer of nylon such as nylon 6,66 or nylon 6,12. Typical of these is a copolymer which is 85 mole percent nylon 6 and 15 mole percent nylon 66. Using the instant copolymer the range of 2.5% to 10% of the second nylon polymer, namely nylon 66, may be obtained within the parameters of blending nylon 6 and the nylon copolymer at weight ratios of approximately 5/1 to 1/2 nylon 6 to nylon copolymer. Other ratios can be developed for other copolymers.

Alternatively the nylon composition may be obtained directly in the form of a copolymer, of nylon 6 and the second nylon polymer, where the composition is 2.5 to 10 mole percent of the second nylon polymer and 97.5 to 90 mole percent nylon 6. An acceptable composition for the nylon layer would be, for example, a nylon 6,66 copolymer having 90% to 97.5% moieties of nylon 6 and 10% to 2.5% nylon 66.

A third barrier layer of EVOH is positioned between the first and second surface layers, as at 16, 16A, 26 and 26A.

While the EVOH adheres to the nylon layer, it has poor adhesion to the olefinic type materials commonly used for the sealant layer. A fourth adhesive layer is disposed adjacent to the EVOH layer, and between the EVOH and the sealant layer. Suitable adhesive polymers which are conventionally available and are known for adhesion to EVOH are typically ethylene or propylene polymers and copolymers. Exemplary of these adhesives are the anhydride modified polyethylenes and ethylene copolymers. Specific examples of modified adhesive polymers which may be used to adhere EVOH to a sealant layer of surlyn are Plexar 158 and Plexar 3, from Chemplex Company, and CXA 3095 from DuPont Company.

Additional layers may be added to the internal film structure as desired, so long as the interlayer adhesion is adequate to keep the film structure intact throughout its useful life; and so long as the combination of functions of the other layers is preserved. Exemplary of such an additional layer are layers 19A and 29A in FIGS. 1A and 2A respectively. In the structures comtemplated by FIGS. 1A and 2A, layers 19A and 29A may be, for example, EVA. EVA adheres well to many of the adhesive layer materials and to many of the sealant layer materials; and its fabrication properties are conducive to its use with the other polymers in the film.

The films of this invention are desirably useful in the packaging of certain meats. In dealing with the environments of that family of packaged goods, the filled and sealed package may encounter high humidity environments which could at least temporarily reduce the oxygen barrier property of the EVOH layer if the moisture evidenced by the high humidity were to reach the EVOH layer. In order to prevent the moisture from reaching the EVOH layer and reducing its effective barrier property, a fifth moisture barrier layer may be disposed in the film between the EVOH layer and the nylon blend layer. Such a layer is represented by layers 27 and 27A in FIGS. 2 and 2A. The composition of the fifth layer is such that it adheres well to the nylon and to the EVOH, and it has the desired moisture barrier property. Polymers which meet these criteria and which are thus useful as the fifth layer are the well known anhydride modified polymer adhesives which are based on polyethylene and polypropylene. Conversely, the second and/or third layer may be modified for adhesion to the fifth layer, in which case the fifth layer need not necessarily be modified for adhesion-enhancing properties.

It should be understood that the fifth and sixth layers may each be used without the other, or may be used in combination.

EXAMPLE 1

A nylon blend composition is made by blending equal parts by weight of nylon 6 and a nylon copolymer which is 85 mole percent nylon 6 and 15 mole percent nylon 66. Using multiple extruders and appropriate combining equipment, a four layer film is coextruded as is described for FIG. 1. The adhesive layer is Plexar 158. The sealant layer is surlyn ionomer from DuPont. Overall, the film is about 3.5 mils thick.

EXAMPLE 2

A film is made as in EXAMPLE 1 except that an additional layer as at 19A in FIG. 1A is added. The additional layer is EVA and comprises 45% of the overall thickness of the film.

EXAMPLE 3

A nylon blend composition is made by the method of EXAMPLE 1 and wherein the nylon 6 and the nylon 6,66 copolymer are blended at the weight ratio of 65% nylon 6/ 35% nylon 6,66. Using multiple extruders and appropriate combining equipment, a five layer film is coextruded as is described for FIG. 2. The adhesive layer as at 24 and the moisture barrier layer as at 27 are both Plexar 158. The sealant layer is surlyn.

EXAMPLE 4

A film is made as in EXAMPLE 3 except that an additional layer is at 29A in FIG. 2A is added. The additional layer is EVA and comprises 30% of the overall thickness of the film.

The primary advantages of nylon 6 are related to its physical stability during fabrication processes which rely on applications of heat to activate the film for fabrication. For example, heat sealing operations may be carried out over a relatively broad range of heat fluxes. Coupled with its heat stability, though, is a requirement that high temperatures be used for fabricating nylon 6 such as into a film layer. Such high heat is required that, even when operating at the lowest processing temperatures acceptable for nylon 6, a temperature near the maximum temperature tolerable to EVOH is being used. Any, even normal, fluctuation in die temperature tends to be either too cold for the nylon 6 to be properly fabricated or to be so hot that it tends to degrade the EVOH.

The primary advantages of nylon copolymer such as nylon 6,66 or nylon 6,12 is that it can be fabricated at a temperature of about 410° to 450° F. which is compatible with the fabrication of the other layers in the films described. Indeed a multiple layer film using 10-20 mole percent nylon 66 is described by JP No. 58 74,313. However, a film using 15 mole percent nylon 66 has limited heat resistance for fabricating packages by heat sealing techniques. Such packages have a high incidence of holes being burned through the packaging film during the heat sealing operation. There is also the tendency of the nylon copolymer to soften and adhere to the sealing bar, causing jam-up of the packaging machine.

Figure 3:
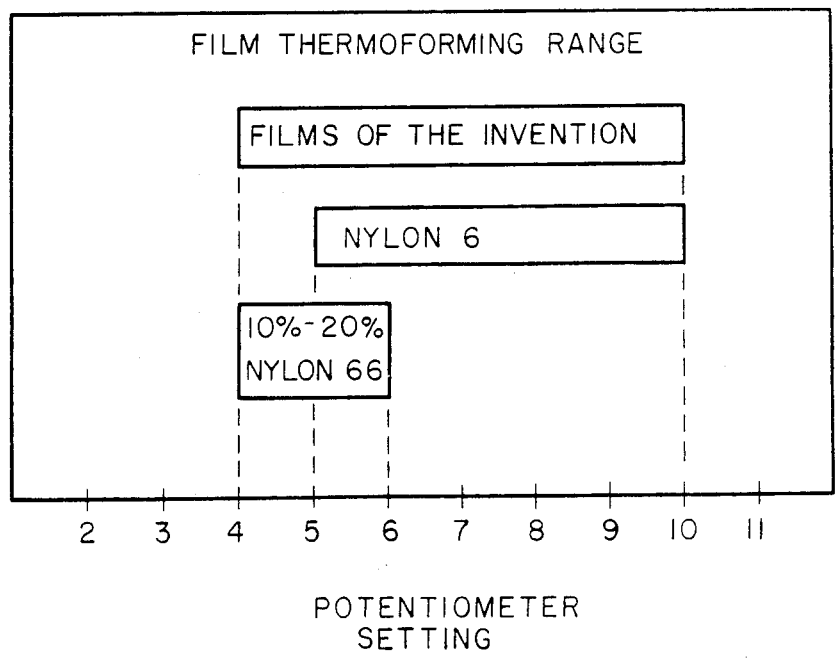
FIG. 3 depicts the thermoforming range of the nylon films of this invention.

As regards thermoforming, it has been unexpectedly found that the films of the instant invention herein have a substantially increased range of heat settings which are acceptable for thermoforming on a given piece of equipment. FIG. 3 illustrates the ranges of heat settings which can be used for thermoforming films of the invention as compared to the films using either all nylon 6 or 10% to 20% nylon 66. Comparative potentiometer settings in the range of 6–10 are highly satisfactory, and work well for thermoforming with nylon 6. Obtaining the nylon 6 multiple layer film by coextrusion is a problem, however, as iterated above, because of its high film formation temperature.

FIG. 3 represents a series of tests for thermoforming films under constant conditions except for changes in the potentiometer heat setting. It shows that films using 10% to 20% nylon 66 can tolerate potentiometer settings only up to 6 on the same equipment and at otherwise the same operation conditions. By observation, it has been found that potentiometer settings greater than 6 yield non-uniformity in the thermoformed packages. Settings in the range of 5-6 can yield good package uniformity if the potentiometer output can be controlled closely enough. As a practical matter, potentiometers used in commercial thermoforming operations do not have the close control of heat output required for use of nylon 6,66 having 10% to 20% nylon 66 component.

FIG. 3 also shows that the films of the invention, surprisingly are adequately softened for thermoforming, and can be thermoformed into commercially acceptable packages, under the same operating conditions at potentiometer settings ranging from 4 to 10. Essentially, the applicants' nylon compositions, having reduced content of the second nylon polymer, as compared to known nylon polymer compositions, exhibit an unexpectedly expanded range of acceptable heat settings, which surprisingly encompasses essentially the entirety of the ranges of the component parts of the blend.

In a companion development, it is seen that the films of the invention exhibit heat tolerance similar to that exhibited by nylon 6 during heat sealing operations while also exhibiting the lower temperature film fabricating properties of films using 10% to 20% nylon copolymer in the nylon layer.

It is seen from the above that the heart of the invention resides in a polymer which comprises 90 to 97.5 mole percent nylon 6 and 10 to 2.5 mole percent of a second nylon polymer. By adhering a film layer of the nylon polymer to a film layer of a heat sealing layer, the multiple layer film has general utility as a heat sealable film. By interposing a barrier layer and selected intermediate layers between the nylon layer and the heat seal layer, various other properties may be readily imparted to the film without departing from the principles and the advantages of the nylon layer.

Films of this invention may conveniently be made in a thickness range of 2–9 mils. While thicker films are not usually economically justified, they are contemplated as being operable.

Having thus described the invention, what is claimed is:

1. A multiple layer film having two surfaces and comprising a first heat sealable layer on one surface thereof and a second nylon layer on the other surface thereof, and wherein the composition of said nylon layer is a blend of 40% to 75% by weight nylon 6 and 60% to 25% by weight of a nylon copolymer wherein the copolymer is 80% to 90% moieties of a first polymer of nylon 6 and 20% to 10% moieties of a second polymer of nylon; the overall composition of the blend comprising 2.5% to 10% moieties of said second polymer of nylon.

2. A multiple layer film as in claim 1 wherein the overall composition of the blend in said nylon surface layer is 5% to 7.5% moieties of said second polymer of nylon, said second polymer of nylon being chosen from the group consisting of nylon 66 and nylon 12.

3. A multiple layer film as in claim 1 and including a functionally adhesive polymer layer between said first and second layers.

4. A multiple layer film as in claim 2 and including a functionally adhesive polymer layer between said first and second layers.

5. A multiple layer heat sealable film having two surfaces, said film comprising:
   (a) a first heat sealable layer on one surface of the film;
   (b) a second nylon layer on the other surface of the film;
   (c) a third polymeric layer of ethylene vinyl alcohol copolymer between said first and second layers; and (d) a fourth adhesive layer between said first and third layers, said second layer comprising a blend of nylon polymer and nylon copolymer; said blend being 40% to 75% by weight nylon 6 and 60% to 25% by weight of a nylon copolymer wherein said copolymer is 80% to 90% moieties of a first polymer of nylon 6 and 20% to 10% moieties of a second polymer of nylon, the overall composition of said blend comprising 2.5% to 10% moieties of said second polymer of nylon.

6. A multiple layer film as in claim 5 and wherein said second polymer of nylon is chosen from the group consisting of nylon 66 and nylon 12.

7. A multiple layer film as in claim 5 and including a fifth layer of polyethylene or polypropylene interposed between said second and third layers.

8. A multiple layer film as in claim 5 and including a sixth layer of a polymer or copolymer of a polypropylene or polyethylene between said first and fourth layers.

9. A multiple layer film as in claim 6 and including a fifth layer of a polyethylene or polypropylene between said second and third layers.

10. A multiple layer film as in claim 6 and including a sixth layer of a polymer or copolymer of a polyethylene or polypropylene between said first and fourth layers.

11. A multiple layer film as in claim 7 and including a sixth layer of a polymer or copolymer of a polyethylene or polypropylene between said first and fourth layers.

12. A multiple layer film as in claim 8 wherein said second polymer of nylon comprises nylon 66 and is present as 5.0% to 5.5% of the overall blend composition of said second layer.

13. A multiple layer film as in claim 10 wherein said second polymer of nylon comprises nylon 66 and is present as 5.0% to 5.5% of the overall blend composition of said second layer.

14. A multiple layer film as in claim 7 wherein said second polymer of nylon comprises nylon 66 and is present as 7.25% to 7.75% of the overall blend composition of said second layer.

15. A multiple layer film as in claim 9 wherein said second polymer of nylon comprises nylon 66 and is present as 7.25% to 7.75% of the overall blend composition of said second layer.

16. A multiple layer film as in claim 5 wherein said fourth layer is an adhesive based on an ethylene polymer or copolymer.

17. A multiple layer film as in claim 6 wherein said fourth layer is an adhesive based on an ethylene polymer or copolymer.

18. A multiple layer film as in claim 7 wherein said fourth layer is an adhesive based on an ethylene polymer or copolymer.

19. A multiple layer film as in claim 8 wherein said fourth layer is an adhesive based on an ethylene polymer or copolymer.

20. A multiple layer film as in claim 9 wherein said fourth layer is an adhesive based on an ethylene polymer or copolymer.

21. A multiple layer film as in claim 10 wherein said fourth layer is an adhesive based on an ethylene polymer or copolymer.

22. A multiple layer film as in claim 11 wherein said fourth layer is an adhesive based on an ethylene polymer or copolymer.

23. A multiple layer film as in claim 12 wherein said fourth layer is an adhesive based on an ethylene polymer or copolymer.

24. A multiple layer film as in claim 13 wherein said fourth layer is an adhesive based on an ethylene polymer or copolymer.

25. A multiple layer film as in claim 15 wherein said fourth layer is an adhesive based on an ethylene polymer or copolymer.

26. A multiple layer film as in claim 7 said first layer comprising surlyn; said second layer being a blend of equal parts by weight of nylon 6 and a copolymer of nylon 6,66, said copolymer comprising 85 mole percent nylon 6 and 15 mole percent nylon 66; said fifth layer comprising a low density polyethylene adhesive.

27. A multiple layer film as in claim 19 and wherein the composition of said sixth layer is chosen from the group consisting of low density polyethylene and ethylene vinyl acetate copolymer.

28. A multiple layer film as in claim 27 and wherein the composition of said second layer is a blend of about 65% by weight nylon 6 and 35% by weight of a copolymer of nylon, said copolymer being about 85 mole percent nylon 6 and 15 mole percent nylon 66, and wherein the composition of said first layer comprises surlyn.

29. A multiple layer film as in claim 8 wherein said second polymer of nylon comprises nylon 66 and is present as 7.25% to 7.75% of the overall blend composition of said second layer.

30. A multiple layer film as in claim 29 wherein said fourth layer is an adhesive based on an ethylene polymer or copolymer.

31. A multiple layer film as in claim 30 and wherein the composition of said sixth layer is chosen from the group consisting of low density polyethylene and ethylene vinyl acetate copolymer.

32. A multiple layer film having two surfaces and comprising a first heat sealable layer on one surface thereof and a second nylon layer on the other surface thereof, and wherein the composition of said second nylon layer is 90 to 97.5 mole percent nylon 6 and 10 to 2.5 mole percent of a second polymer of nylon.

33. A multiple layer film as in claim 32 wherein said second polymer of nylon is chosen from the group consisting of nylon 66 and nylon 12.

34. A multiple layer film as in claim 32 wherein the composition of said second nylon layer is 92.5 to 95 mole percent nylon 6 and 7.5 to 5 mole percent of said second polymer of nylon.

35. A multiple layer film as in claim 33 wherein the composition of said second nylon layer is 92.5 to 95 mole percent nylon 6 and 7.5 to 5 mole percent of said second polymer of nylon.

36. A multiple layer film as in claim 32 and further comprising a third polymeric layer of ethylene vinyl alcohol copolymer between said first and second layers and a fourth adhesive layer between said first and third layers.

37. A multiple layer film as in claim 33 and further comprising a third polymeric layer of ethylene vinyl alcohol copolymer between said first and second layers and a fourth adhesive layer between said first and third layers.

38. A multiple layer film as in claim 32 and wherein the composition of said first layer is surlyn, the composition of said second nylon layer is 92.25 to 92.75 mole percent nylon 6 and 7.75 to 7.25 mole percent of said second nylon polymer, said film further comprising a fourth adhesive layer between said first and third layers, said adhesive layer being based on a polymer chosen from the group consisting of ethylene vinyl acetate copolymer and low density polyethylene; and a fifth layer between said second and third layers, said fifth layer being based on a polymer chosen from the group consisting of polyethylene and polypropylene.

39. A multiple layer film as in claim 38 and wherein said fourth adhesive layer is based on ethylene vinyl acetate copolymer and said fifth layer is based on a low density polyethylene.

40. A multiple layer film as in claim 32 and wherein the composition of said first layer is surlyn, the composition of said second nylon layer is 94.5 to 95 mole percent nylon 6 and 5 to 5.5 mole percent of said second nylon polymer, said film further comprising a fourth adhesive layer between said first and third layers, said adhesive layer being based on a polymer from the group consisting of ethylene vinyl acetate copolymer and low density polyethylene; and a sixth layer between said first and fourth layers, said sixth layer being a polymer or copolymer of polypropylene or polyethylene.

41. A multiple layer film as in claim 40 and wherein said fourth adhesive layer is based on ethylene vinyl acetate copolymer and said sixth layer is based on an ethylene vinyl acetate.

* * * * *